(12) United States Patent
Morroni (10) Patent No.: US 11,762,405 B2
(45) Date of Patent: *Sep. 19, 2023

(54) POWER COMBINER AND BALANCER

(71) Applicant: Texas Instruments Incorporated, Dallas, TX (US)

(72) Inventor: Jeffrey Anthony Morroni, Highlands Ranch, CO (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/380,114

(22) Filed: Jul. 20, 2021

(65) Prior Publication Data

US 2021/0349486 A1 Nov. 11, 2021

Related U.S. Application Data

(60) Continuation of application No. 16/889,892, filed on Jun. 2, 2020, now Pat. No. 11,099,588, which is a
(Continued)

(51) Int. Cl.
*G05F 1/56* (2006.01)
*H02M 3/28* (2006.01)
(Continued)

(52) U.S. Cl.
CPC .................. *G05F 1/56* (2013.01); *G06F 1/26* (2013.01); *H02J 1/10* (2013.01); *H02J 1/102* (2013.01);
(Continued)

(58) Field of Classification Search
None
See application file for complete search history.

(56) References Cited

U.S. PATENT DOCUMENTS

| 3,356,855 A | 12/1967 | Suzuki et al. |
| 6,031,362 A | 2/2000 | Bradley |

(Continued)

FOREIGN PATENT DOCUMENTS

| CN | 1661877 A | 8/2005 |
| CN | 104299780 A | 1/2015 |

(Continued)

OTHER PUBLICATIONS

International Search Report and Written Opinion of the International Searching Authority, PCT/US2016/020469, dated Jun. 30, 2016 (8 pages).
(Continued)

*Primary Examiner* — Matthew V Nguyen
(74) *Attorney, Agent, or Firm* — Ming Wai Choy; Frank D. Cimino (57) ABSTRACT

A power combining technique includes receiving a first voltage at a first input and a second voltage at a second input. The power combining technique further includes combining, with at least two power converters, power received from the first and second inputs into a single power rail. A power balancing technique further includes controlling the at least two power converters such that a first one of the power converters outputs an amount of current to the single power rail that is proportional to and/or equal to the amount of current output by another of the power converters.

18 Claims, 5 Drawing Sheets

Related U.S. Application Data continuation of application No. 15/882,670, filed on Jan. 29, 2018, now Pat. No. 10,698,431, which is a division of application No. 14/719,575, filed on May 22, 2015, now Pat. No. 9,880,574.

(60) Provisional application No. 62/127,069, filed on Mar. 2, 2015.

(51) Int. Cl.
| | | |
|---|---|---|
| *H02J 1/10* | (2006.01) | |
| *H02M 3/158* | (2006.01) | |
| *G06F 1/26* | (2006.01) | |
| *H02M 1/00* | (2006.01) | |
| *H02M 1/08* | (2006.01) | |

(52) U.S. Cl.
CPC ......... *H02M 3/158* (2013.01); *H02M 3/1584* (2013.01); *H02M 3/285* (2013.01); *H02J 1/106* (2020.01); *H02M 1/0003* (2021.05); *H02M 1/08* (2013.01)

(56) References Cited

U.S. PATENT DOCUMENTS

| | | | |
|---|---|---|---|
| 6,343,026 | B1 | 1/2002 | Perry |
| 6,768,658 | B2 * | 7/2004 | Perry ................. H02M 3/1584 |
| | | | 307/82 |
| 7,336,058 | B1 | 2/2008 | Lo et al. |
| 7,616,464 | B2 * | 11/2009 | Phadke ............. H02M 3/33576 |
| | | | 363/79 |
| 7,856,519 | B2 | 12/2010 | Tan et al. |
| 7,925,906 | B2 | 4/2011 | Ranganathan et al. |
| 7,944,721 | B2 | 5/2011 | Yang |
| 7,952,294 | B2 | 5/2011 | Shteynberg et al. |
| 8,536,852 | B2 | 9/2013 | Huang et al. |
| 9,369,042 | B1 | 6/2016 | Khayat |
| 10,200,050 | B1 | 2/2019 | Ren |
| 10,224,802 | B1 * | 3/2019 | Chakkirala ......... H02M 3/3376 |
| 2004/0169499 | A1 | 9/2004 | Huang et al. |
| 2006/0119383 | A1 | 6/2006 | Castaldo et al. |
| 2009/0251934 | A1 | 10/2009 | Shteynberg et al. |
| 2010/0153625 | A1 | 6/2010 | Sugita et al. |
| 2011/0298443 | A1 | 12/2011 | Kanemitsu |
| 2013/0246815 | A1 | 9/2013 | Uehara |
| 2014/0008987 | A1 | 1/2014 | Tyagi et al. |
| 2014/0015507 | A1 | 1/2014 | Park et al. |
| 2014/0111179 | A1 | 4/2014 | Couleur |
| 2014/0375288 | A1 | 12/2014 | Nora |
| 2015/0016016 | A1 | 1/2015 | Lee |
| 2015/0268678 | A1 | 9/2015 | Yu |
| 2016/0211745 | A1 | 7/2016 | Hang et al. |
| 2017/0025950 | A1 | 1/2017 | Wu |
| 2017/0070071 | A1 | 3/2017 | Han |
| 2018/0048230 | A1 | 2/2018 | Park et al. |
| 2019/0165665 | A1 * | 5/2019 | Dai ................. H02M 3/1582 |
| 2020/0021189 | A1 | 1/2020 | Li |
| 2021/0223838 | A1 * | 7/2021 | Yeh ................. H02M 3/33523 |

FOREIGN PATENT DOCUMENTS

| | | | |
|---|---|---|---|
| EP | 1605571 | A1 | 12/2005 |
| JP | 2008109736 | A | 5/2008 |
| JP | 2009163409 | A | 7/2009 |
| JP | 2012244866 | A | 12/2013 |
| SU | 547751 | A1 | 2/1977 |
| SU | 1275641 | A1 | 12/1986 |

OTHER PUBLICATIONS

Siri et al., "Analysis and evaluation of current-sharing control for parallel-connected DC-DC converters taking into account cable resistance," Aerospace Applications Conference, 1995, Proceedings IEEE, pp. 29-48, Feb. 4-11, 1995.

Tabisz et al., "Present and future of distributed power systems," Applied Power Electronics Conference and Exposition, 1992, APEC '92, Conference Proceedings 1992, Seventh Annual, pp. 11-18, Feb. 23-27, 1992.

Siri et al., "Current distribution control for parallel connected converters: Part 1," Aerospace and Electronics Systems, IEEE Transactions on vol. 28, No. 3, pp. 829-840, Jul. 1992.

Sun, Juanjuan, "Dynamic performance analyses of current sharing control for DC/DC converters," Virginia Polytechnic Institute and State University, 248 pages.

European Search Report, Application No. 16759419.1, dated May 22, 2018 (9 pages).

First Office Action for; JP Application No. 2017-546601; dated Dec. 18, 2019.

Translation of First Office Action for; JP Application No. 2017-546601; dated Dec. 18, 2019.

Notification of first Office Action for: PRC (China) Pat. Appln. No. 201680010738.3; email date: Apr. 7, 2020.

\* cited by examiner

POWER COMBINER AND BALANCER

This application is a continuation of U.S. patent application Ser. No. 16/889,892, filed on Jun. 2, 2020, which is a continuation of U.S. patent application Ser. No. 15/882,670, filed on Jan. 29, 2018 (now U.S. Pat. No. 10,698,431), which is a division of U.S. patent application Ser. No. 14/719,575, filed on May 22, 2015 (now U.S. Pat. No. 9,880,574), which claims the benefit of U.S. Provisional Application No. 62/127,069, filed on Mar. 2, 2015, the entire content of all are incorporated herein by reference.

TECHNICAL FIELD

The disclosure relates to electrical circuits, and in particular, to power processing circuits.

BACKGROUND

In storage applications, servers have traditionally used hard disk drive (HDDs) for the storage of data. Recently, however, solid-state drives (SSDs) have been generating interest due to their low power consumption, fast operation and high reliability. HDD systems and SSD systems may have different power supply requirements.

SUMMARY

According to some aspects of this disclosure, an integrated circuit includes a first input, a second input, and an output. The integrated circuit further includes a first power converter having a voltage input coupled to the first input of the integrated circuit, a control input, and an output coupled to the output of the integrated circuit. The integrated circuit further includes a second power converter having a voltage input coupled to the second input of the integrated circuit, a control input, and an output coupled to the output of the first power converter and to the output of the integrated circuit. The voltage input of the second power converter is free of connection to the voltage input of the first power converter. The integrated circuit further includes a first power converter control circuit having a first input coupled to a reference voltage lead, a second input coupled to the output of the first power converter, and an output coupled to the control input of the first power converter. The integrated circuit further includes a second power converter control circuit having a first input, a second input, and an output coupled to the control input of the second power converter. The integrated circuit further includes a first current sensing circuit having an input coupled to the output of the first power converter, and an output coupled to the first input of the second power converter control circuit. The integrated circuit further includes a second current sensing circuit having an input coupled to the output of the second power converter, and an output coupled to the second input of the second power converter control circuit. The second power converter control circuit is free of connection with the reference voltage line.

According to additional aspects of this disclosure, a device includes a first power converter having an input and an output. The device further includes a second power converter having an input and an output. The input of the second power converter is free of connection to the input of the first power converter. The device further includes a power management integrated circuit (PMIC) having an input coupled to the outputs of the first and second power converters. The device further includes one or more data storage device components coupled to the power management PMIC.

According to additional aspects of this disclosure, a device includes a first power converter having an input and an output. The device further includes a second power converter having an input and an output. The input of the second power converter is free of connection to the input of the first power converter. The output of the second power converter is coupled to the output of the first power converter. The device further includes first control circuitry configured to control the first power converter based on a signal indicative of the voltage at the output of the first power converter and a reference voltage. The device further includes second control circuitry configured to control the second power converter based on a signal indicative of a current at the output of the first power converter and a signal indicative of a current at the output of the second power converter.

According to additional aspects of this disclosure, a method includes receiving a first voltage at a first input and a second voltage at a second input. A voltage level of the first voltage is different than a voltage level of the second voltage. The method further includes combining, with a first power converter and a second power converter, power received from the first and second inputs into a single power rail. The method further includes controlling the second power converter such that the second power converter outputs an amount of current to the single power rail that is proportional to an amount of current output to the single power rail by the first power converter.

DETAILED DESCRIPTION

This disclosure describes techniques for combining power supplied by at least two different power supply rails into a single output power rail. The power rail combining techniques described in this disclosure may use at least two different power converters with their outputs coupled together and with their inputs coupled to different power supply rails to combine two voltages into a single, regulated output voltage that may be used to supply power to one or more devices.

Combining different power rails into a single output power rail may allow devices that are configured to receive power via a single power supply rail to be used in legacy systems that include two different power supply rails, while still allowing such devices to draw power from each of the legacy power supply rails. In this way, powered devices that use a single power supply may be retrofitted into legacy systems in a relatively power-efficient manner and without requiring replacement of the existing power supply infrastructure in such systems.

This disclosure also describes techniques for balancing the power supplied by at least two different power supply rails when combining the power from such rails into a single output power rail. The power balancing techniques may include controlling at least two power converters that are used to combine at least two different power supply rails such that a first one of the power converters outputs an amount of current to the single power rail that is proportional to and/or equal to the amount of current output by another of the power converters.

Controlling the currents that are output by the power converters in this manner may allow the amount of power drawn from each of the power supply rails to be controlled. In this way, the relative amount of power drawn from multiple different supply rails may be dynamically balanced at a target balancing ratio.

In storage applications, servers have traditionally used hard disk drives (HDDs) for the storage of data. Recently, however, solid-state drives (SSDs) have been generating interest due to their low power consumption, fast operation and high reliability. HDD systems and SSD systems may have different power supply requirements. For example, spinning hard drives may utilize two separate power rails with two separate voltages (e.g., 12 volts (V) and 5V), both of which may be needed to operate the spinning hard drives. SSD drives, on the other hand, may include a power management integrated circuit (PMIC) which generates multiple low voltages from a single input voltage. The different number of power supply voltages and rails that may be used for HDD and SSD systems may present significant challenges with respect to power processing when retrofitting HDD type systems with SSDs.

In some examples, the techniques of this disclosure may use two power converters to combine two separate power supply rails in an HDD type system into a single, regulated output voltage rail that is suitable for use by one or more SSD components and/or for a power management integrated circuit (PMIC) that supplies power to one or more SSD components. For example, each of the two power converters may have an input that is coupled to a respective power supply rail (e.g., 12V or 5V), and the outputs of the power converters may be coupled together to generate a single output power rail for one or more SSD components and/or a PMIC.

Combining HDD power supply rails in this manner may allow legacy HDD power distribution systems to be used to power an SSD data storage device, while at the same time allowing the SSD data storage device to draw power from each of the legacy HDD power supply rails. In this way, SSDs may be retrofitted into legacy HDD systems in a relatively power-efficient manner and without requiring replacement of the existing HDD power distribution infrastructure.

One technique for retrofitting HDD type systems with SSDs is to use two separate PMICs (i.e., one for each power rail) and to statically allocate approximately half the load to the 5V rail and approximately half the load to the 12V rail. Doing so may keep the total power under the power envelope requirements. However, this technique may not be ideal because the power drawn from each of the rails may not be perfectly balanced between 12V rails and 5V rails due to non-idealities in the converters and/or due to dynamics in the various loads.

The techniques in this disclosure may be used to actively balance power between two HDD power supply inputs that are combined into a single output voltage rail. For example, when two power converters are used to combine two HDD power supply inputs into a single output, a first one of the power converters may be configured to regulate the output voltage of the first power converter at a voltage that is suitable for supplying power to SSD components and/or to a PMIC that powers SSD components. A second power converter may be configured to regulate the output current of the second power converter at a level that is proportional to and/or substantially matches the level of current output by the first power converter.

Operating two power converters in this manner may allow the power drawn from each of the power supply rails to be dynamically balanced at a particular balancing ratio and/or equalized during operation of the SSD. In this way, the power efficiency of a retrofitted SSD drive may be improved compared to systems that statically allocate SSD components to individual HDD power rails based on worst case power consumption estimates. In addition, the techniques of this disclosure may simplify power design across platforms by making a unified output which may feed, in some cases, all downstream supplies.

Figure 1:
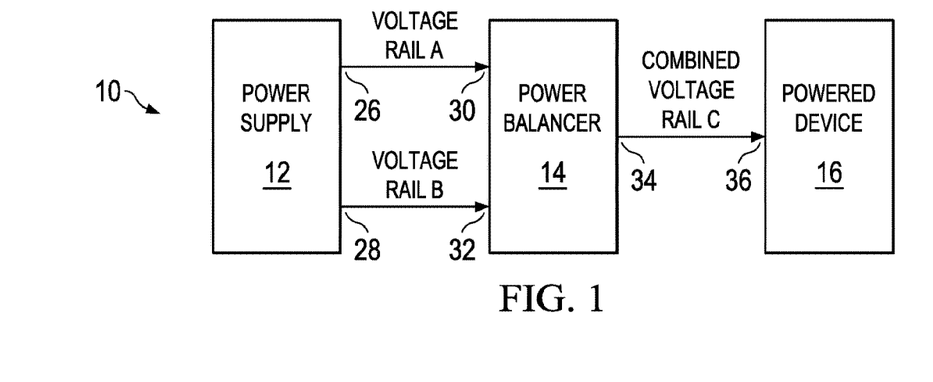
FIG. 1 is a block diagram illustrating an example powered system according to this disclosure.

FIG. 1 is a block diagram illustrating an example powered system 10 according to this disclosure. Powered system 10 includes a power supply 12, a power balancer 14, a powered device 16, voltage rails A, B and a combined voltage rail C.

Power supply 12 includes outputs 26, 28. Power balancer 14 includes inputs 30, 32, and an output 34. Powered device 16 includes an input 36.

Outputs 26, 28 of power supply 12 are coupled, respectively, to inputs 30, 32 of power balancer 14 via voltage rails A, B. Output 34 of power balancer 14 is coupled to input 36 of powered device 16 via combined voltage rail C.

Example operation of powered system 10 will now be described. Power supply 12 regulates each of voltage rails A, B at a respective direct current (DC) voltage level. In some examples, the DC voltage level of voltage rail B may be different than the DC voltage level of voltage rail A. Power balancer 14 receives the voltages on voltage rails A, B at inputs 30, 32, respectively, and combines the voltages to generate the voltage on combined voltage rail C at output 34. In some examples, power balancer 14 may dynamically balance the power drawn from voltage rails A, B such that the power drawn from voltage rail A substantially equals and/or is proportional to the power drawn from voltage rail B. Power balancer 14 may provide power to powered device 16 via combined voltage rail C. Powered device 16 may perform one or more device operations and/or power one or more device components based on power received from combined voltage rail C.

As discussed above, power supply 12 may regulate each of voltage rails A, B at a direct current (DC) voltage level. Regulating each of voltage rails A, B at a DC voltage level may refer to outputting a respective voltage level on each of voltage rails A, B where the respective voltage level remains substantially constant over a range of load impedances. In other words, power supply 12 may act as a set of independent voltage sources—a first independent voltage source that produces a substantially constant voltage on voltage rail A, and a second independent voltage source that produces a substantially constant voltage on voltage rail B.

In some examples, power supply 12 may be a hard disk drive (HDD) power supply that is configured to output regulated voltages suitable for powering HDD components. For example, voltage rail A may be regulated at 12 volts (V), and voltage rail B may be regulated at 5V. In another example, voltage rail A may be regulated at 12V, and voltage rail B may be regulated at 3.3V.

As discussed above, power balancer 14 receives the voltages on voltage rails A, B and combines the voltages to generate a single output voltage on combined voltage rail C. Specifically, power balancer 14 receives a first voltage at input 30 and a second voltage at input 32, and combines the first and second voltages to generate the output voltage on combined voltage rail C. Combining the first and second voltages may refer to combining power associated with the first and second voltages to generate a combined voltage. In other words, power balancer 14 may transfer power from input 30 to output 34 and from input 32 to output 34 by combining power received at inputs 30, 32 into a single output power rail (i.e., combined voltage rail C).

As further discussed above, power balancer 14 may dynamically balance the power drawn from voltage rails A, B such that the power drawn from voltage rail A substantially equals and/or is proportional to the power drawn from voltage rail B. Dynamically balancing the power drawn from voltage rails A, B may include dynamically balancing the current drawn from each of voltage rails A, B such that the amount of current drawn from voltage rail B multiplied by the voltage of voltage rail B is substantially equal to and/or proportional to the amount of current drawn from voltage rail A multiplied by the voltage of voltage rail A.

Power balancer 14 may include any circuitry configured to combine inputs 30, 32 into output 34 and/or to balance power drawn from voltage rails A, B. In some examples, power balancer 14 may include two separate power converters with outputs coupled together and inputs coupled to respective ones of inputs 30, 32. In some examples, the power converters may be DC-to-DC power converters, such as, e.g., buck converters, boost converters, isolated converters, and low-dropout regulators (LDOs).

Powered device 16 may be any combination of one or more devices that are powered by combined voltage rail C. In some examples, powered device 16 may be a solid-state drive (SSD) that includes a power management integrated circuit (PMIC) and one or more SSD components. In further examples, powered device 16 may be a PMIC.

According to this disclosure, power balancer 14 may combine power supplied by at least two different power supply rails (e.g., voltage rails A, B) into a single output power rail (i.e., combined voltage rail C). Combining different power rails into a single output power rail may allow devices that are configured to receive power via a single power supply rail to be used in legacy systems that include two different power supply rails, while still allowing such devices to draw power from each of the legacy power supply rails. In this way, powered devices that use a single power supply may be retrofitted into legacy systems in a relatively power-efficient manner and without requiring replacement of the existing power supply infrastructure in such systems.

According to this disclosure, power balancer 14 may control the relative amounts of power supplied by at least two different power supply rails (e.g., voltage rails A, B) when combining the power into a single power rail. In this way, power balancer 14 may balance the amount of power drawn from each of the power supply rails to a target balancing ratio, thereby increasing the power efficiency of the system.

Figure 2:
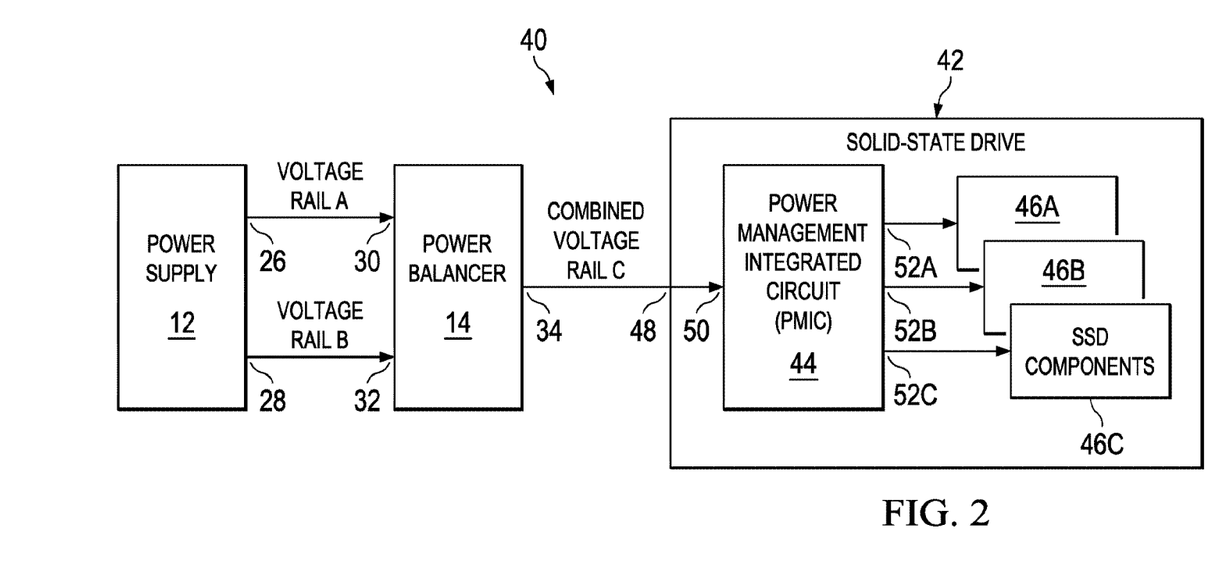
FIG. 2 is a block diagram illustrating an example powered system that may be used to implement the powered system of FIG. 1.

FIG. 2 is a block diagram illustrating an example powered system 40 that may be used to implement powered system 10 illustrated in FIG. 1. Powered system 40 includes similar components to those illustrated in FIG. 1 except that powered device 16 has been replaced by solid-state drive 42. Solid-state drive 42 may, in some examples, correspond to and be used to implement powered device 16 illustrated in FIG. 1.

Solid-state drive 42 includes a power management integrated circuit (PMIC) 44, SSD components 46A, 46B, 46C (collectively, "SSD components 46"), and an input 48. Input 48 is coupled to output 34 of power balancer 14 via combined voltage rail C.

PMIC 44 includes an input 50 that is coupled to output 34 of power balancer 14 via combined voltage rail C. Input 50 may correspond to input 48 of solid-state drive 42. PMIC 44 also includes outputs 52A, 52B, 52C (collectively, "outputs 52"). Each of outputs 52 is coupled to a respective one of SSD components 46.

Solid-state drive 42 may store and retrieve data for a client system. Solid-state drive 42 may be powered completely or at least in part by combined voltage rail C. Because power balancer 14 transfers power from power supply 12 to combined voltage rail C, solid-state drive 42 may also said to be powered completely or in part by voltage rail A and voltage rail B of power supply 12.

PMIC 44 may receive power via input 50, and manage the distribution of received power to SSD components 46 via outputs 52. Managing the distribution of received power to SSD components 46 may involve outputting a regulated voltage on each of outputs 52. The regulated voltages output on each of outputs 52 may be the same or different. In some examples, PMIC 44 may perform one or more of the following functions: power management, voltage regulation, DC-to-DC conversion, voltage scaling, dynamic voltage scaling, dynamic frequency scaling, and power sequencing.

In some examples, solid-state drive 42 may store data without using a motor or mechanically spinning disks. For example, solid-state drive 42 may store data using a memory array and/or an integrated circuit array that is accessed via an electronic interface.

Each of SSD components 46 may receive power from PMIC 44 via a respective one of power lines coupled to outputs 52. SSD components 46 may be any components that assist in the operation of solid-state drive 42. In some examples, SSD components 46 may include one or more of controllers, memory arrays, integrated circuit storage arrays, and other components used by an SSD.

In some examples, power supply 12 may be an HDD power supply that is configured to output voltages suitable for powering an HDD. For example, power supply 12 may output a 12V voltage on voltage rail A and either 5V or 3.3V voltage on voltage rail B. Other combinations are also possible. In such examples, voltage rails A, B may be referred to as HDD power supply rails.

In examples where voltage rails A, B are HDD power supply rails, power balancer 14 may use two power converters to combine two separate HDD power supply rails (e.g., voltage rails A, B) of powered system 40 into a single, regulated output voltage rail (e.g., combined voltage rail C) that is suitable for use by PMIC 44 and/or SSD components 46. For example, each of the two power converters may have an input that is coupled to a respective power supply rail (e.g., voltage rails A, B), and the outputs of the power converters may be coupled together to generate a single output voltage rail for PMIC 44 and/or SSD components 46.

Combining HDD power supply rails in this manner may allow legacy HDD power distribution systems (e.g., voltage rails A, B) to be used to power solid-state drive 42, while at the same time allowing solid-state drive 42 to draw power from each of the legacy HDD power supply rails. In this way, solid-state drive 42 may be retrofitted into legacy HDD systems in a relatively power-efficient manner and without requiring replacement of the existing HDD power supply infrastructure.

The techniques in this disclosure may be used to actively balance power between two HDD power supply inputs that are combined into a single output voltage rail. Operating two power converters in this manner may allow the power drawn from each of the HDD power supply rails to be dynamically balanced at a particular ratio and/or equalized during operation of solid-state drive 42. In this way, the power efficiency of a retrofitted SSD drive may be improved compared to systems that statically allocate SSD components to individual HDD power rails based on worst case power consumption estimates. In addition, the techniques of this disclosure may simplify power design across platforms by making a unified output which may feed, in some examples, all downstream supplies.

Figure 3:
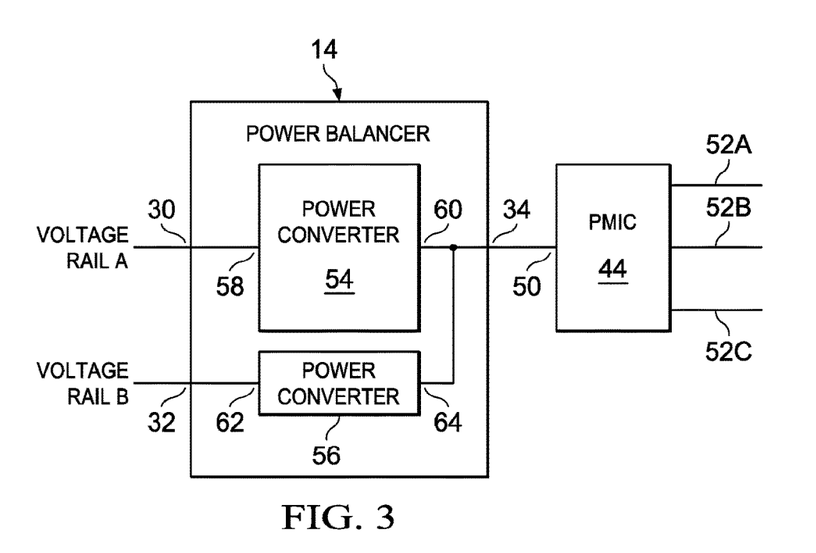
FIG. 3 is a block diagram illustrating an example power balancer that may be used in the powered systems of FIGS. 1 and 2.

FIG. 3 is a block diagram illustrating an example power balancer 14 that may be used in the powered systems of FIGS. 1 and 2. Although usable in either of the systems of FIGS. 1 and 2, for purposes of explanation, power balancer 14 of FIG. 3 will be illustrated and described as being used in powered system 40 of FIG. 2.

Power balancer 14 includes power converters 54, 56. Power converter 54 includes an input 58 and an output 60. Power converter 56 includes an input 62 and an output 64. Input 58 is coupled to voltage rail A, and input 62 is coupled to voltage rail B. Output 60 is coupled to output 64, and both of outputs 60, 64 are coupled to input 50 of PMIC 44.

Power converter 54 may receive power at input 58 and transfer some or all of the received power to output 60 for use by PMIC 44. Power converter 56 may receive power at input 62 and transfer some or all of the received power to output 64 for use by PMIC 44.

In some examples, each of power converters 54, 56 may convert the voltage received at their respective inputs 58, 62 to other respective voltages, and output the respective voltages at outputs 60, 64. Similarly, each of power converters 54, 56 may convert the current received at their respective inputs 58, 62 to other respective currents, and output the respective currents at outputs 60, 64. In other words, power converters 54, 56 may convert the form of power received at inputs 58, 62 to another form of power at outputs 60, 64.

In some examples, power converter 54 may regulate the voltage produced at output 60 such that the voltage is substantially equal to and/or proportional to a reference voltage. The reference voltage may correspond to and/or be proportional to a specified power rail voltage for PMIC 44. In such examples, power converter 56 may, in some examples, regulate the current produced at output 64 such that the amount of current produced by power converter 56 at output 64 is substantially equal to and/or proportional to the amount of current produced by power converter 54 at output 60.

In some examples, each of power converters 54, 56 may be a DC-to-DC converter. In further examples, power converters 54, 56 may be any combination of buck converters (e.g., synchronous buck converters), boost converters, isolated converters, low-dropout (LDO) regulators, linear power converters (e.g., linear voltage regulators), switching power converters (e.g., switching voltage regulators), or other DC-to-DC converters.

In some examples, power balancer 14 may be used to combine power rails that are associated with power supplies in HDD type systems. Using two power converters 54, 56 to combine HDD power supply rails in the manner shown by FIG. 3 may allow legacy HDD power distribution systems to be used to power PMIC 44 (and corresponding SSD data storage devices), while at the same time allowing the SSD data storage devices to draw power from each of the legacy HDD power supply rails. In this way, SSDs may be retrofitted into legacy HDD systems in a relatively power-efficient manner and without requiring replacement of the existing HDD power supply and distribution infrastructure. In addition, combining the power rails in this manner may simplify power design across platforms by making a unified output which may feed, in some cases, all downstream supplies.

Another technique for retrofitting HDD type systems with SSDs involves using two separate power chains with two separate power converters and two separate PMICs (i.e., one power converter and PMIC for each power rail). A system designer may statically allocate approximately half the load to the 5V rail and approximately half the load to the 12V rail. Doing so may keep the total power under the power envelope requirements. However, this technique may not be ideal because the power drawn from each of the rails may not be perfectly balanced between 12V rails and 5V rails due to non-idealities in the converters and/or due to dynamics in the various loads.

Causing power converter 56 to regulate the current at output 64 such that it is substantially the same as and/or proportional to the amount of current output by power converter 54 at output 60 may allow power balancer 14 to actively and dynamically balance power between two HDD power supply inputs that are combined into a single output voltage rail. Operating two power converters 54, 56 in this manner may allow the power drawn from each of the power supply rails to be dynamically balanced at a particular ratio and/or equalized during operation of the SSD. In this way, the power efficiency of a retrofitted SSD drive may be improved compared to systems that statically allocate SSD components to individual HDD power rails based on worst case power consumption estimates.

Figure 4:
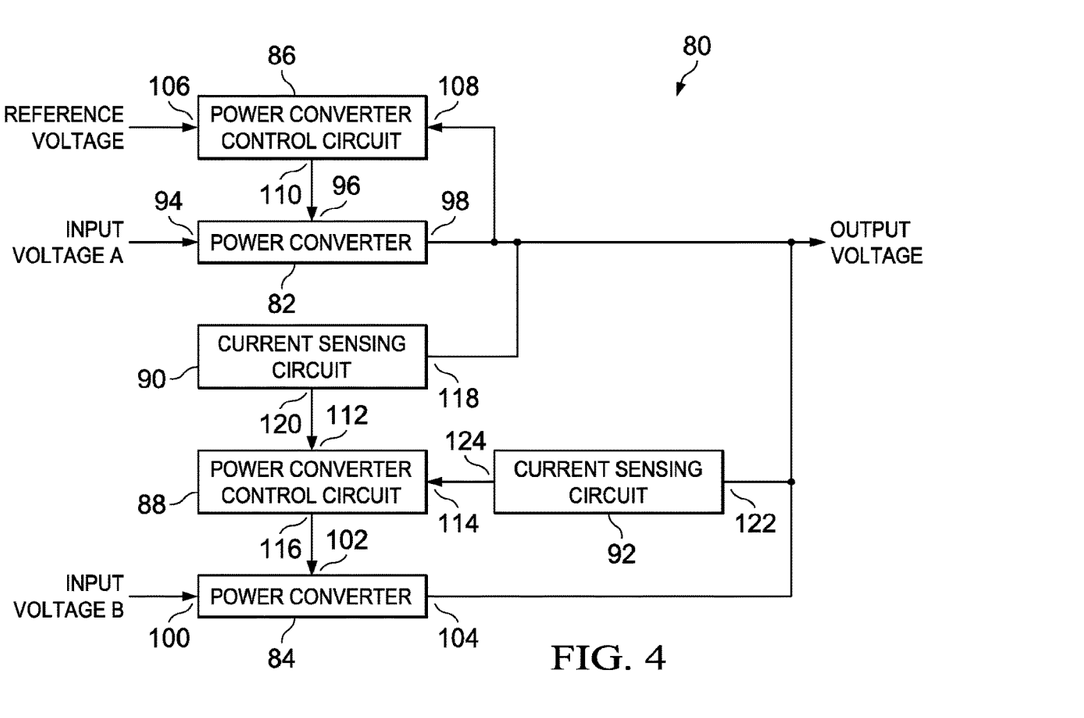
FIG. 4 is a block diagram illustrating another example power balancer according to this disclosure.

FIG. 4 is a block diagram illustrating another example power balancer 80 according to this disclosure. Power balancer 80 may be used to implement any of power balancers 14 illustrated in FIGS. 1-3.

Power balancer 80 includes power converters 82, 84, power converter control circuits 86, 88, and current sensing circuits 90, 92. Power converter 82 includes a voltage input 94, a control input 96, and an output 98. Power converter 84 also includes a voltage input 100, a control input 102, and an output 104. Power converter control circuit 86 includes a reference input 106, a feedback input 108, and an output 110. Power converter control circuit 88 also includes a reference input 112, a feedback input 114, and an output 116. Current sensing circuit 90 includes an input 118, and an output 120. Current sensing circuit 92 also includes an input 122 and an output 124.

Voltage input 94 of power converter 82 is coupled to input voltage A. Voltage input 100 of power converter 84 is coupled to input voltage B. Output 98 of power converter 82 is coupled to output 104 of power converter 84. Outputs 98, 104 of power converters 82, 84 may form an output voltage for power balancer 80. Input voltage A, input voltage B, and the output voltage may correspond, respectively, to voltage rail A, voltage rail B, and combined voltage rail C in FIGS. 1 and 2. In some cases, input voltage A may form input 30 for power balancer 14 shown in any of FIGS. 1-3, input voltage B may form input 32 for power balancer 14, and the output voltage may form output 34 for power balancer 14 shown in any of FIGS. 1-3.

Reference input 106 of power converter control circuit 86 is coupled to input voltage A. Feedback input 108 of power converter control circuit 86 is coupled to output 98 of power converter 82. Output 110 of power converter control circuit 86 is coupled to control input 96 of power converter 82.

Output 98 of power converter 82 is coupled to input 118 of current sensing circuit 90. Output 120 of current sensing circuit 90 is coupled to reference input 112 of power converter control circuit 88. Output 104 of power converter 84 is coupled to input 122 of current sensing circuit 92. Output 124 of current sensing circuit 92 is coupled to feedback input 114 of power converter control circuit 88. Output 116 of power converter control circuit 88 is coupled to control input 102 of power converter 84.

Example operation of power balancer 80 will now be described. Power converter 82 may receive power at voltage input 94 and transfer some or all of the received power to output 98. Power converter 84 may receive power at voltage input 100 and transfer some or all of the received power to output 104. Collectively, power converters 82, 84 may combine the powered received at voltage inputs 92, 100 into a single power rail that supplies the output voltage for power balancer 80.

Power converter control circuit 86 receives via feedback input 108 a signal indicative of the voltage at output 98 of power converter 82. Power converter control circuit 86 also receives a reference voltage signal via reference input 106. Power converter control circuit 86 generates a control signal based on the signal indicative of the voltage at output 98 of power converter 82 and the reference voltage signal. Power converter control circuit 86 may generate the control signal such that the control signal causes power converter 82 to regulate output 98 of power converter 82 at a voltage level that is equal to and/or proportional to the reference voltage received via reference input 106. Power converter control circuit 86 outputs the control signal at output 110, which is received by power converter 82 at control input 96.

Current sensing circuit 90 generates a signal indicative of the amount of current produced by power converter 82 at output 98, and outputs the signal indicative of the amount of current via output 120. Similarly, current sensing circuit 92 generates a signal indicative of the amount of current produced by power converter 84 at output 104, and outputs the signal indicative of the amount of current via output 124.

Power converter control circuit 88 receives via reference input 112 the signal indicative of the amount of current produced by power converter 82. Power converter control circuit 88 receives via feedback input 114 the signal indicative of the amount of current produced by power converter 84. Power converter control circuit 88 generates a control signal based on the signal indicative of the current produced by power converter 82 and the signal indicative of the current produced by power converter 84. Power converter control circuit 88 may generate the control signal such that the control signal causes power converter 84 to regulate the amount of current produced at output 104 at a level that is substantially equal to and/or proportional to the amount of current produced at output 98 of power converter 82. Power converter control circuit 88 outputs the control signal at output 116, which is received by power converter 84 at control input 102.

Power converter control circuit 86 and power converter 82 may together regulate the voltage level of the output voltage of power converter 82 at a voltage level that is equal to or proportional to the reference voltage. Power converter control circuit 88 and power converter 84 may together balance the currents that are output by each of power converters 82, 84 such that the amount of current output by power converter 84 substantially equals and/or is proportional to the amount of current output by power converter 82.

The reference voltage may be supplied internally by power balancer 80 or may be an external input to power balancer 80. The reference voltage may be indicative of a voltage at which output 98 of power converter 82 is to be regulated. In some examples, the voltage at which output 98 is to be regulated may correspond to and/or be proportional to a power supply voltage requirement or specification for a PMIC or other powered device that is powered by power balancer 80.

In some examples, the signal indicative of the voltage at output 98 of power converter 82 may be the actual voltage at output 98. For example, output 98 may be directly coupled or electrically coupled to feedback input 108.

In some examples, inputs 118, 122 of current sensing circuits 90, 92 may be magnetically coupled, respectively to outputs 98, 104 of power converters 82, 84. In further examples, inputs 118, 122 of current sensing circuits 90, 92 may be directly coupled, respectively to outputs 98, 104 of power converters 82, 84.

In some examples, current sensing circuits 90, 92 may each include one or more sensing elements (e.g., resistors) that are placed along current paths between outputs 98, 104 of power converters 82, 84 and the output of power balancer 80. In such examples, when output 98 of power converter 82 is said to be coupled to output 104 of power converter 84, output 98 may be coupled to output 104 through the one or more sensing elements that are placed in series along the current paths between outputs 98, 104 and the output of power balancer 80.

As discussed above, power converter control circuit 86 may generate a control signal such that the control signal causes power converter 82 to regulate output 98 of power converter 82 at a level that is equal to and/or proportional to the reference voltage received via reference input 106. In some examples, the control signal may be a function of and/or indicative of a difference between the signal received at feedback input 108 and the reference voltage received at reference input 106. For example, the control signal may, in some examples, be equal to the difference between the signal received at feedback input 108 and the reference voltage received at reference input 106. In additional examples, the control signal may be a filtered version of the difference between the signal received at feedback input 108 and the reference voltage received at reference input 106 (e.g., a proportional-integral (PI) filtered version of the difference between the signal received at feedback input 108 and the reference voltage received at reference input 106).

As also discussed above, power converter control circuit 88 may generate a control signal such that the control signal causes power converter 84 to regulate the amount of current produced at output 104 at a level that is substantially equal to and/or proportional to the amount of current produced at output 98 of power converter 82. In some examples, the control signal may be a function of and/or indicative of a difference between the signals received at reference input 112 and feedback input 114. For example, the control signal may, in some examples, be equal to the difference between the signals received at reference input 112 and feedback input 114. In additional examples, the control signal may be a filtered version of the difference between the signals received at reference input 112 and feedback input 114 (e.g., a PI filtered version of the difference between the signals received at reference input 112 and feedback input 114).

In some examples, each of power converters 54, 56 may be a DC-to-DC converter. In further examples, power converters 54, 56 may be any combination of buck converters (e.g., synchronous buck converters), boost converters, isolated converters, low-dropout (LDO) regulators, linear power converters (e.g., linear voltage regulators), switching power converters (e.g., switching voltage regulators), or other DC-to-DC converters. Power converters 54, 56 need not by the same type of power converter.

In examples where power converters 54, 56 are DC-to-DC converters that include a pass element (e.g., a pass transistor in a buck converter, boost converter, or LDO), the control signals output by power converter control circuits 86, 88 may control the amount of power and/or current passed by the pass element. For example, the control signal may control the gate of a transistor.

In examples where power converters 54, 56 are linear voltage power converters (e.g., LDOs), the amplitude of the control signal output by power converter control circuit 86 may, in some examples, vary based on the difference between the voltage at output 98 of power converter 82 and the reference voltage. Similarly, the amplitude of the control signal output by power converter control circuit 88 may, in some examples, vary based on the difference between the amount current produced at output 98 of power converter 82 and the amount of current produced at output 104 of power converter 84. In such examples, the control signals output by power converter control circuits 86, 88 may be used, for example, to regulate the on resistance of respective pass transistors in each of power converters 82, 84.

In examples where power converters 54, 56 are switching voltage power converters (e.g., buck converters, boost converters), the duty cycle of the control signal output by power converter control circuit 86 may, in some examples, vary based on the difference between the voltage at output 98 of power converter 82 and the reference voltage. Similarly, the duty cycle of the control signal output by power converter control circuit 88 may, in some examples, vary based on the difference between the amount current produced at output 98 of power converter 82 and the amount of current produced at output 104 of power converter 84. In such examples, the control signals output by power converter control circuits 86, 88 may be used, for example, to regulate the duty cycle of relatively high frequency signals that are coupled to respective pass transistors in each of power converters 82, 84.

Figure 5:
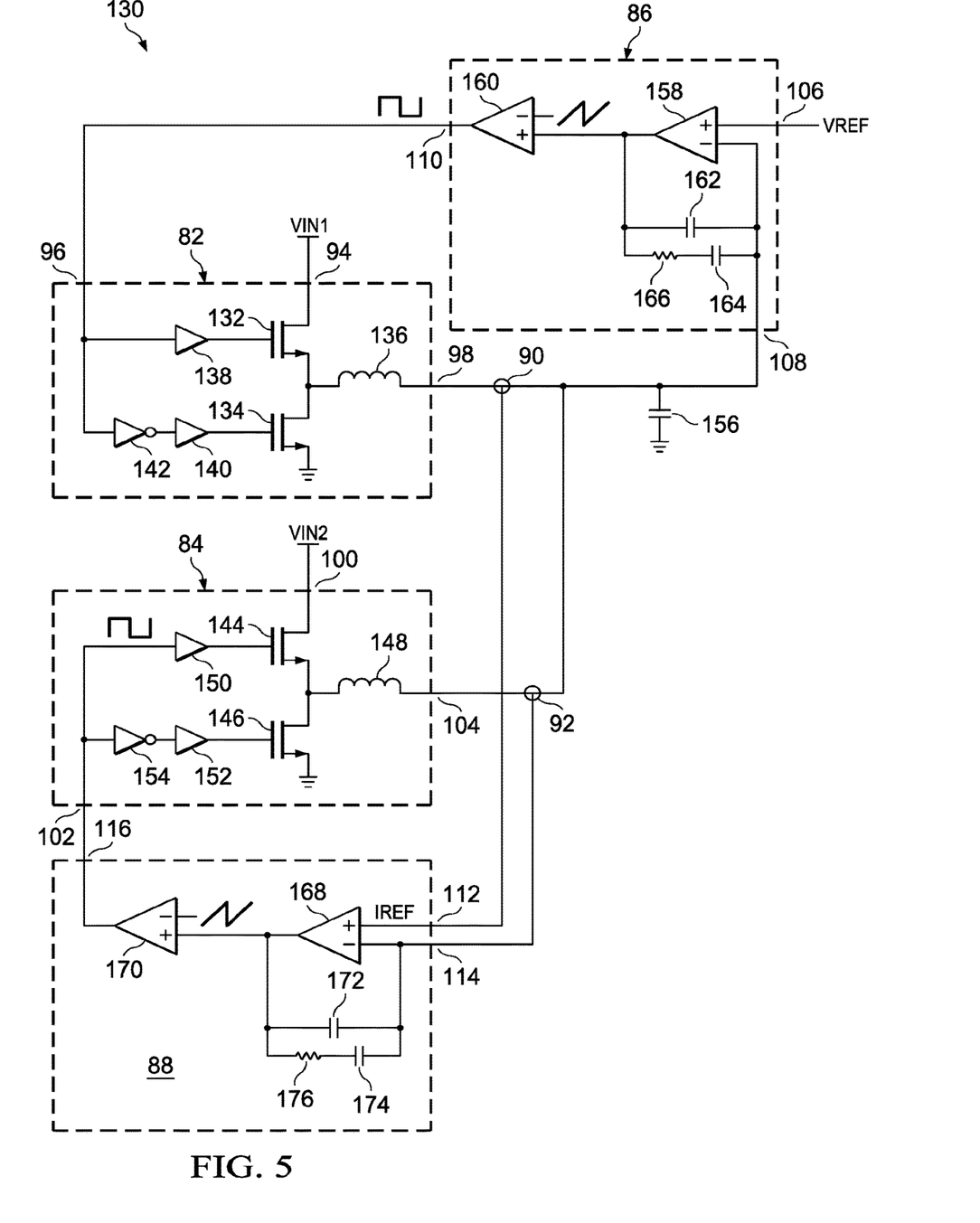
FIGS. 5-6 are schematic diagrams illustrating additional example power balancers according to this disclosure.

FIG. 5 is a schematic diagram illustrating an example power balancer 130 that may be used to implement power balancer 80 illustrated in FIG. 4 according to this disclosure. Same or similar components between FIGS. 4 and 5 have been numbered with identical reference numerals.

Power converter 82 includes a high-side transistor 132, a low-side transistor 134, an inductor 136, gate drivers 138, 140, and an inverter 142. High-side transistor 132 includes: (1) a drain terminal coupled to voltage input 94, (2) a gate terminal coupled to an output of gate driver 138, and (3) a source terminal coupled to a drain terminal of low-side transistor 134 and a first terminal of inductor 79. Low-side transistor 134 includes: (1) a drain terminal coupled to the source terminal of high-side transistor 132 and the first terminal of inductor 136, (2) a gate terminal coupled to an output of gate driver 140, and (3) a source terminal coupled to a ground reference voltage.

Gate driver 138 includes an input coupled to control input 96, and an output coupled to the gate of high-side transistor 132. Inverter 142 includes an input coupled to control input 96, and an output coupled to an input of gate driver 140. Gate driver 140 includes an input coupled to the output of inverter 142, and an output coupled to the gate of low-side transistor 134.

Inductor 136 includes a first terminal coupled to the source of high-side transistor 132 and to the drain of low-side transistor 134. Inductor 136 further includes a second terminal coupled to output 98.

Power converter 84 includes transistors 144, 146, an inductor 148, gate drivers 150, 152, and an inverter 154. The components in power converter 84 are the same as those in power converter 82 and are arranged in a similar configuration. Accordingly, the arrangement of these components will not be described in further detail.

Power balancer 130 further includes a capacitor 156. Capacitor 156 includes: (1) a first terminal coupled to output 98 of power converter 82 and to output 104 of power converter 84, and (2) a second terminal coupled to a ground reference voltage. Although capacitor 156 is illustrated as being outside of power converters 82, 84, in other examples, capacitor 156 may form a part of one or both of power converters 82, 84. Each of power converters 82, 84 in power balancer 130 may be a synchronous buck converter.

Power converter control circuit 86 includes operational amplifiers 158, 160, capacitors 162, 164, and a resistor 166. Operational amplifier 158 includes: (1) a non-inverting input coupled to reference input 106, (2) an inverting input coupled to feedback input 108, to a first terminal of capacitor 162, and to a first terminal of capacitor 164, and (3) an output coupled to a non-inverting input of operational amplifier 160, a second terminal of capacitor 162, and a first terminal of resistor 166. Operational amplifier 160 includes: (1) an inverting input coupled to a sawtooth waveform signal, (2) a non-inverting input coupled to the output of operational amplifier 158, (3) and an output coupled to output 110. A second terminal of capacitor 164 is coupled to a second terminal of resistor 166. It should be noted that another type of amplifier or differential amplifier may, in some examples, be substituted for one or both of operational amplifiers 158, 160 and/or for one or more of any of the other operational amplifiers described in this disclosure.

Operational amplifier 158, capacitors 162, 164, and resistor 166 may form a proportional-integral (PI) filter that generates a filtered difference between reference input 106 and feedback input 108. Operational amplifier 160 may form a signal generator that generates a control signal for power converter 82 based on the filtered difference between reference input 106 and feedback input 108.

Power converter control circuit 88 includes operational amplifiers 168, 170, capacitors 172, 174, and a resistor 176. The components in power converter control circuit 88 are the same as those in power converter control circuit 86 and are arranged in a similar configuration. Accordingly, the arrangement of these components will not be described in further detail.

The operation of power balancer 130 will now be described. Power converter 82 transfers power from input voltage A to output 98 based on a control signal received at control input 96. The voltage at output 98 may be determined at least in part based on the duty cycle of control input 96. The control signal alternatively switches transistors 132, 134 on and off in a synchronous buck converter-like fashion to transfer power from voltage input 94 to output 98.

Power converter control circuit 86 generates a control signal to regulate the voltage at output 98 of power converter 82 at a voltage level determined by the reference voltage. To generate the control signal, the PI filter formed by operational amplifier 158, capacitors 162, 164, and resistor 166 compares the output voltage at output 98 of power converter 82 to the reference voltage, and generates a signal indicative of a filtered difference between the output voltage at output 98 of power converter 82 and the reference voltage.

Power converter control circuit 86 generates the control signal based on the signal indicative of the filtered difference between the output voltage of power converter 82 (i.e., the output voltage at output 98) and the reference voltage. To generate the control signal, operational amplifier 160 compares the signal indicative of the filtered difference between the output voltage of power converter 82 and the reference voltage to a sawtooth waveform, and generates a signal indicative of whether the signal indicative of the filtered difference between the output voltage of power converter 82 and the reference voltage is greater than or less than the sawtooth waveform at any given moment in time. This causes the duty cycle of the resulting signal to reflect the filtered difference between the output voltage of power converter 82 and the reference voltage.

The control loop formed by power converter control circuit 86 causes power converter 82 to regulate output 98 at a constant output voltage that is substantially equal to the reference voltage. If the output voltage at output 98 were to become greater than the reference voltage, then the output of the PI filter formed by operational amplifier 158, capacitors 162, 164, and resistor 166 would increase, thereby causing the duty cycle of the control signal to decrease, which in turn would cause power converter 82 to decrease the voltage at output 98. Similarly, if the output voltage at output 98 were to become less than the reference voltage, then the output of the proportional-integral filter formed by operational amplifier 158, capacitors 162, 164, and resistor 166 would decrease, thereby causing the duty cycle of the control signal to increase, which in turn would cause power converter 82 to increase the voltage at output 98. In this way, power converter 82 and power converter control circuit 86 operate together to regulate the voltage level at output 98 such that the voltage level is substantially equal to the reference voltage.

Power converter 84 transfers power from input voltage B to output 104 based on a control signal received at control input 102. The current produced by power converter 84 at output 104 may be determined at least in part based on the duty cycle of control input 102. The control signal alternatively switches transistors 144, 146 on and off in a synchronous buck converter-like fashion to transfer power from voltage input 100 to output 104.

Current sensing circuit 90 generates a signal indicative of the current produced at output 98 of power converter 82. Current sensing circuit 92 generates a signal indicative of the current produced at output 104 of power converter 84.

Power converter control circuit 88 generates a control signal to regulate the current produced at output 104 of power converter 84 such that the amount of current produced at output 104 of power converter 84 is substantially equal to the amount of current produced at output 98 of power converter 82. To generate the control signal, the PI filter formed by operational amplifier 168, capacitors 172, 174, and resistor 176 compares the signal indicative of the current produced at output 104 of power converter 84 to the signal indicative of the current produced at output 98 of power converter 82, and generates a signal indicative of a filtered difference between the currents.

Power converter control circuit 88 generates the control signal based on the signal indicative of the filtered difference between the currents. To generate the control signal, operational amplifier 170 compares the signal indicative of the filtered difference between the currents to a sawtooth waveform, and generates a signal indicative of whether the signal indicative of the filtered difference between the currents is greater than or less than the sawtooth waveform at any given moment in time. This causes the duty cycle of the resulting signal to reflect the filtered difference between the output currents produced by power converters 82, 84.

The control loop formed by power converter control circuit 88 causes power converter control circuit 88 to regulate the amount current produced at output 104 at an amount of current that is approximately equal to the amount of current produced at output 98 of power converter 82. If the output current produced at output 104 were to become greater than the output current produced at output 98, then the output of the PI filter formed by operational amplifier 168, capacitors 172, 174, and resistor 176 would increase, thereby causing the duty cycle of the control signal to decrease, which in turn would cause power converter 84 to decrease the amount of current produced at output 104. Similarly, if the output current produced at output 104 were to become less than the output current produced at output 98, then the output of the proportional-integral filter formed by operational amplifier 168, capacitors 172, 174, and resistor 176 would decrease, thereby causing the duty cycle of the control signal to increase, which in turn would cause power converter 84 to increase the amount of current produced at output 104. In this way, power converter 84 and power converter control circuit 88 operate together to regulate the amount of current produced by power converter 82 at output 104 to substantially match the amount of current produced by power converter 84 at output 98.

As such, power balancer 130 may combine two input voltages provided by two power supply rails into a single, regulated output voltage supply rail. Power balancer 130 may regulate the output voltage supply rail at the reference voltage, and may control power converters 82, 84 such that the amount of current drawn from each of power converters 82, 84 is approximately equal. In this way, power converter control circuit 86 may balance the power drawn from each of the two power supply rails.

Figure 6:
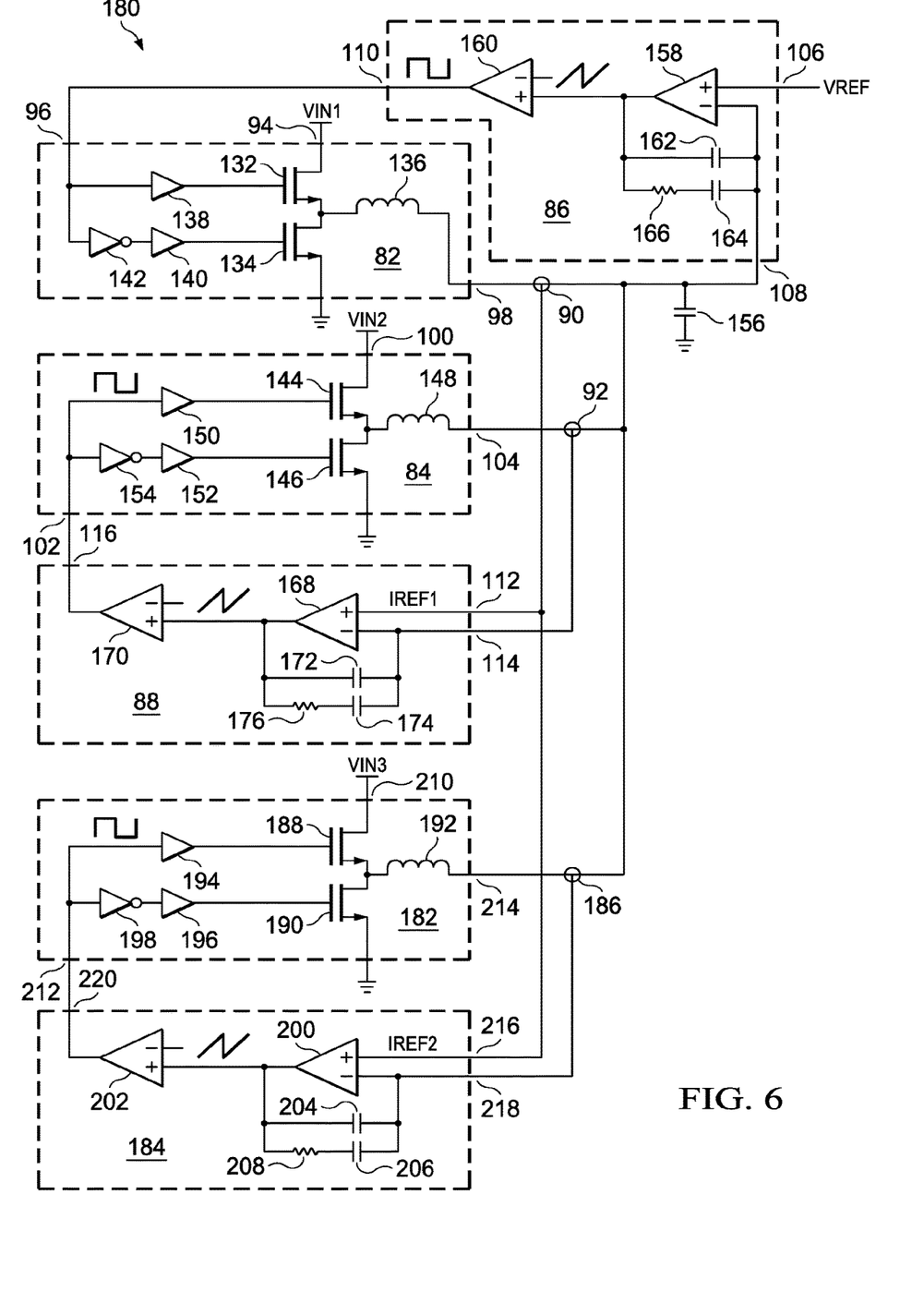

FIG. 6 is a schematic diagram illustrating an example power balancer 180 according to this disclosure. In some examples, power balancer 180 may be used to implement the power balancers illustrated in FIG. 1 or 2. Power balancer 180 in FIG. 6 is similar to power balancer 130 shown in FIG. 5 except that an additional power converter 182, power converter control circuit 184, and current sensing circuit 186 have been added. Same or similar components between FIGS. 5 and 6 have been numbered with identical reference numerals.

Power converter 182 includes a high-side transistor 188, a low-side transistor 190, an inductor 192, gate drivers 194, 196, and an inverter 198. Power converter control circuit 184 includes operational amplifiers 200, 202, capacitors 204, 206, and a resistor 208. Power converter 182 further includes a voltage input 210, a control input 212, and an output 214. Power converter control circuit 184 further includes a reference input 216, a feedback input 218, and an output 220.

Voltage input 210 of power converter 182 is coupled to input voltage C. Control input 212 of power converter 182 is coupled to output 220 of power converter control circuit 184. Output 214 of power converter 182 is coupled to output 98 of power converter 82 and output 104 of power converter 84. Output 214, output 98, and output 104 may form the output voltage supply rail for power balancer 180.

Current sensing circuit 186 includes an input coupled to output 214 of power converter 182, and an output coupled to feedback input 218 of power converter control circuit 184. Current sensing circuit 186 generates a signal indicative of the current produced at output 214 of power converter 182. Reference input 216 is coupled to the output of current sensing circuit 92, and feedback input 218 is coupled to the output of current sensing circuit 186.

During operation, power converter control circuit 86 and power converter 82 regulate the voltage at output 98 such that the voltage is substantially equal to the reference voltage. Power converter control circuit 88 and power converter 84 regulate the amount of current produced at output 104 such that the amount of the amount of current produced at output 104 of power converter 84 is substantially equal to the amount of current produced at output 98 of power converter 82. Power converter control circuit 184 and power converter 182 regulate the amount of current produced at output 214 such that the amount of the amount of current produced at output 214 of power converter 182 is substantially equal to the amount of current produced at output 104 of power converter 84. In this way, power balancer 180 may combine three different input power rails while balancing the power drawn from each of the power rails.

Figure 7:
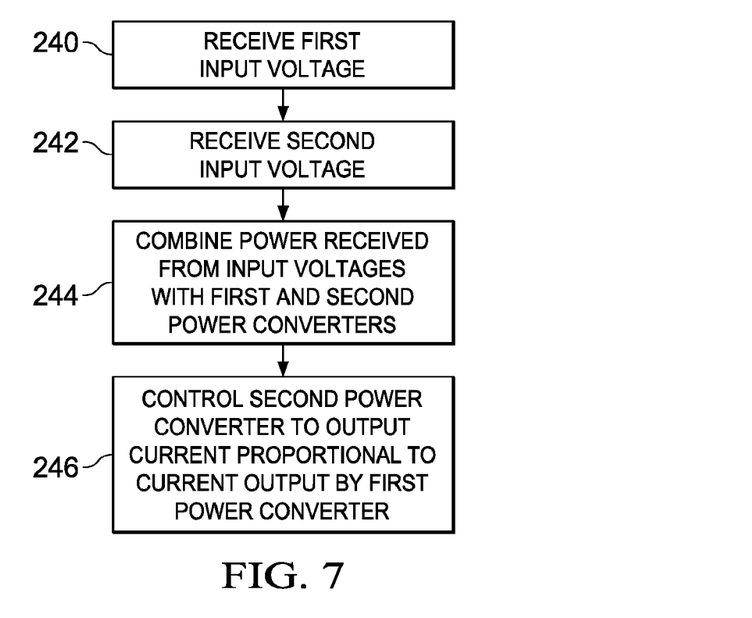
FIG. 7 is a flow diagram illustrating an example technique for combining and balancing power according to this disclosure.

FIG. 7 is a flow diagram illustrating an example technique for combining and balancing power according to this disclosure. The technique illustrated in FIG. 7 may be used in any of the systems or power converters described in this disclosure.

Power balancer 14 receives a first voltage at a first input (240). Power balancer 14 receives a second voltage at a second input (242). In some examples, the voltage level of the first voltage is different than a voltage level of the second voltage. Power balancer 14 combines, with power converters 82, 84, power received from the first and second inputs (i.e., received from the first and second input voltages) into a single power rail (244). Power balancer 18 controls power converter 84 such that power converter 84 outputs an amount of current to the single power rail that is proportional to an amount of current output to the single power rail by power converter 82 (246). In some examples, power balancer 14 may control power converters 82, 84 such that each of power converters 82, 84 outputs a same amount of current to the single power rail In some examples, as shown in FIGS. 1-4, this disclosure describes an integrated circuit (e.g., power balancers 14, 80) that includes a first input 30, a second input 32, and an output 34. The integrated circuit includes a power converter 82 having: (1) a voltage input 94 coupled to input 30 of the integrated circuit, (2) a control input 96, and (3) an output 98 coupled to output 34 of the integrated circuit. The integrated circuit further includes a power converter 84 having: (1) a voltage input 100 coupled to input 32 of the integrated circuit, (2) a control input 102, and (3) an output 104 coupled to output 98 of power converter 82 and to output 34 of the integrated circuit.

The integrated circuit further includes a power converter control circuit 86 having: (1) a reference input 106 coupled to a reference voltage lead, (2) a feedback input 108 coupled to output 98 of power converter 82, and (3) an output 110 coupled to control input 96 of power converter 82. The integrated circuit further includes a power converter control circuit 88 having: (1) a reference input 112, (2) a feedback input 114, and (3) an output 116 coupled to control input 102 of power converter 84.

The integrated circuit further includes a current sensing circuit 90 having: (1) an input 118 coupled to output 98 of power converter 82, and (2) an output 120 coupled to reference input 112 of power converter control circuit 88. The integrated circuit further includes a current sensing circuit 92 having: (1) an input 122 coupled to output 104 of power converter 84, and (2) an output 124 coupled to the feedback input 114 of power converter control circuit 88. In some examples, voltage input 94 of power converter 82 is free of connection to voltage input 100 of power converter 84. In further examples, power converter control circuit 88 is free of connection to the reference voltage lead and/or the reference voltage.

In some examples, power converters 82, 84 are buck converters. In further examples, power converters 82, 84 are low-dropout regulators (LDOs).

In additional examples, power converter 82 is a first type of power converter, and power converter 84 is a second type of power converter. For example, power converter 82 may be a buck converter, and power converter 84 may be an LDO. As another example, power converter 82 may be an LDO, and power converter 84 may be a buck converter. Other types of power converters include buck converters (e.g., synchronous buck converters, non-synchronous buck converters), boost converters, isolated converters, low-dropout (LDO) regulators, linear power converters (e.g., linear voltage regulators), switching power converters (e.g., switching voltage regulators), or other DC-to-DC converters.

In some examples, input 118 of current sensing circuit 90 is magnetically coupled to output 98 of power converter 82, and input 122 of current sensing circuit 92 is magnetically coupled to output 104 of power converter 84. In additional examples, input 118 of current sensing circuit 90 is electrically coupled to output 98 of power converter 82, and input 122 of current sensing circuit 92 is electrically coupled to output 104 of power converter 84

In some examples, power converter 82 and power converter control circuit 86 regulate a voltage produced at output 98 of power converter 82 such that a magnitude of the voltage is proportional to a magnitude of the reference voltage. In such examples, power converter 84 and power converter control circuit 88 regulate a current produced at output 104 of power converter 84 such that a magnitude of the current is proportional to a magnitude of a current produced at output 98 of power converter 82.

In some examples, power converter 82 and power converter control circuit 86 regulate a voltage produced at output 98 of power converter 82 such that a magnitude of the voltage is equal to a magnitude of the reference voltage. In additional examples, power converter 84 and power converter control circuit 88 regulate a current produced at output 104 of power converter 84 such that a magnitude of the current is equal to a magnitude of a current produced at output 98 of power converter 82.

In some examples, the integrated circuit may be part of a powered system that further includes a powered device 16 (e.g., FIGS. 1 and 2) having input 36 coupled to each of the outputs 98, 104 of power converters 82, 84. In some examples, powered device 16 is a PMIC 44. In such examples, the powered device may be a solid-state drive, and PMIC 44 is coupled to one or more of SSD components 46.

In some examples, the powered system may include a power supply 12 (e.g., FIGS. 1 and 2) having an output 26 coupled to voltage input 94 of power converter 82, and an output 28 coupled to output 98 of power converter 84. In some examples, power supply 12 may be configured to output a first voltage at output 26 of power supply 12 and a second voltage at output 28 of power supply 12, and the magnitude of the first voltage may be different than the magnitude of the second voltage.

In some examples, this disclosure describes, as shown for example in FIGS. 2 and 3, a device that includes a power converter 54 having an input 58 and an output 60. The device further includes a power converter 56 having an input 62 and an output 64. The device further includes a PMIC 44 having an input 50 coupled to outputs 60, 64 of power converters 54, 56. The device further includes one or more data storage device components (e.g., SSD components 46) coupled to PMIC 44. In some examples, input 62 of power converter 56 is free of connection to input 58 of power converter 54.

In some examples, power converters 54, 56 are buck converters. In further examples, power converters 54, 56 are low-dropout regulators (LDOs). In additional examples, power converter 54 is a first type of power converter, and power converter 56 is a second type of power converter.

In some examples, power converter 54 is configured to regulate a voltage produced at output 60 of power converter 54 such that a magnitude of the voltage is proportional to a magnitude of the reference voltage. In such examples, power converter 56 is configured to regulate a current produced at output 64 of power converter 56 such that a magnitude of the current corresponds to a magnitude of a current produced at output 60 of power converter 54. In some examples, power converter 56 is configured to regulate the current produced at output 64 of power converter 56 without using a signal indicative of the voltage at output 64 of power converter 56.

In some examples, this disclosure describes a device that includes a power converter 82 having a voltage input 94 and an output 98. The device further includes a power converter 84 having a voltage input 100 and an output 104. Output 104 of power converter 84 is coupled to output 98 of power converter 82. The device further includes first control circuitry (e.g., power converter control circuit 86) configured to control power converter 82 based on a signal indicative of the voltage at the output of the first power converter and a reference voltage. The device further includes second control circuitry (e.g., power converter control circuit 88) configured to control the second power converter based on a signal indicative of a current at output 98 of power converter 82 and a signal indicative of a current at output 104 of power converter 84. In some examples, voltage input 100 of power converter 84 is free of connection to voltage input 94 of power converter 82.

In some examples, the second control circuitry controls the output 104 without using a signal indicative of a voltage at output 104 of power converter 84. In further examples, the second control circuitry controls power converter 84 without using a signal indicative of the reference voltage.

In some examples, each of the power balancer circuits described in this disclosure (e.g., power balancers 14, 80, 130, 180) may be implemented on a single integrated circuit where the inputs of the respective power balancer circuit are coupled to respective input pins of the integrated circuit and the output of the respective power balancer circuit is coupled to output pins of the integrated circuit.

This disclosure describes control techniques to combine two voltage inputs into one voltage output with control of the amount of current that is supplied from each voltage input. In some examples, the techniques may include combining two independent input voltages into a single regulated output voltage.

In storage applications, spinning hard drives generally utilize two separate voltages, 12V and 5V. These two voltages may be necessary to operate the spinning hard drives. Recently, solid-state drives (SSDs) have been generating interest due to their low power consumption, fast operation and high reliability. SSDs may include a power management integrated circuit (PMIC) which generates multiple low voltages from a single input voltage. This makes retrofitting older, hard disk drive (HDD) type systems with SSDs more difficult as the HDD may have two separate input voltages.

One technique for dealing with retrofitting HDD type systems with SSDs is to roughly allocate half the load to the 5V rail and half the load to the 12V rail. Doing so may maximize the usable power consumption by keeping total power under the necessary power envelope. However this technique may not be ideal as the power is not perfectly balanced between 12V rails and 5V rails due to non-idealities in the converters and due to dynamics in the various loads.

This disclosure describes techniques for actively balancing power between the two inputs and for combining the inputs into a single output suitable for SSD PMICs. In some examples, the techniques of this disclosure may use two power converters, one for the 12V rail and one for the 5V rail, the output of each converter may be combined into a single, regulated output. The 12V rail converter regulates it output voltage to a reference. The 5V rail converter regulates its output current to match, or be a percentage of, the 12V converters output current. In this way, the two input voltages can be combined onto a single regulated output with power drawn from each rail controlled by the 5V power converter.

The techniques described in this disclosure may be capable of actively balancing current between two separate inputs and combining them to a single rail. Other techniques may include utilizing both rails as separate with only very rough (not active) current balancing.

One technique for retrofitting HDD type systems with SSDs is to use two separate PMICs (i.e., one for each power rail) and to statically allocate approximately half the load to the 5V rail and approximately half the load to the 12V rail. In other words, rather than combining the two inputs onto a single rail, the technique may maintain two separate rails, which are individually regulated. Such a technique may have one or more drawbacks. First, the amount of power may need to be equally distributed from the two inputs. In order to do so, an engineer may need to roughly partition the worst case loads such that one half are on one rail, the other half are on the second rail. Such partitioning may be a significant design challenge, and may lead to inaccuracies. Second, performing a static allocations based on worst case power estimates may reduce the ability flexibility to port this design to other products or product families. Because the loads may need to be roughly equally balanced among the two input voltages, the system needs to be redesigned with every next generation.

The techniques described in this disclosure may allow a user to increase their power envelope. Rather than being limited by the ability to balance powers (as with some other techniques), the techniques of this disclosure may make sure power delivered from each source is the same so that the total power envelope can be closer approached. In addition, the techniques of this disclosure may simplify power design across platforms by making a unified output which may feed, in some cases, all downstream supplies.

As shown in FIG. 3, power balancer 14 may use two power converters 54, 56 to combine two separate inputs into a single, voltage regulated output. For example, in cases where power converters 54, 56 are buck converters, power balancer 14 may control one buck converter to regulate its output voltage. Power balancer 14 may regulate the other buck converter such that the output current matches the output current of the other buck converter. Power converters 54, 56 in FIG. 3 may be any type converters, including boost converters, LDOs, isolated converters, as well as other converters.

In some examples, the techniques of this disclosure may combine two input voltage sources into one, regulated output voltage source, while maintaining the output current of a first power converter equal to the output current of a second power converter.

As shown in FIG. 5, power converter 82 may be supplied by a first input voltage, VIN1. The output voltage of power converter 82 may be regulated by first measuring the output voltage and comparing it to a reference, VREF. Power converter control circuit 86 may use a compensation network (e.g., a proportional-integral (PI) compensation network as formed by operational amplifier 158, capacitors 162, 164 and resistor 166 as shown in FIG. 5) to generate a compensated error signal (e.g., output of operational amplifier 158), which is fed to a comparator (e.g., operational amplifier 162). The comparator compares the compensated error to a sawtooth to generate a square wave with a duty cycle. The duty cycle controls the output voltage to regulate VOUT to VREF by adjustment of the compensated error signal.

Power converter control circuit 88 may measure the current produced by power converter 82 and the current produced by power converter 84. The output current of power converter 82 becomes the reference for controlling power converter 84. In a similar manner, the control loop (e.g., formed by power converter control circuit 88) adjusts the duty cycle of the control signal power converter 84 so that its output current equals the output current of power converter 82.

In some examples, the current sensing performed by current sensing circuits 90, 92 and current sensing circuit 186 may be performed using any of variety of techniques, both internal to the chip and external to the chip. Although power converters 82, 84 are depicted as buck converters in FIG. 5, other power converters for processing power may be used, including, e.g., switching regulators or LDOs. The power switches may be internal to the chip or external to the chip Although FIGS. 3-5 illustrate the techniques of this disclosure as being implemented with two power converters, the techniques of this disclosure may also be implemented with more than two power converters, as shown, e.g., in FIG. 6. In FIG. 6, the third power converter (e.g., power converter 182) current reference becomes the output current of the second power converter. In this way, the power combination and balancing techniques of this disclosure may be scalable to a higher and/or lower number of power converters.

The techniques and circuitry described in this disclosure may, in some examples, be implemented on any combination of one or more integrated circuits. Although illustrative examples have been shown and described by way of example, a wide range of alternative examples are possible within the scope of the foregoing disclosure.

What is claimed is:
1. A device comprising:
a power converter control circuit having a reference voltage input and a control output;
a first power converter having a first power input, a control input, and a first power output, the control input coupled to the control output, and the first power output coupled to a combined power output; and
a second power converter having a second power input; and a second power output, the second power output coupled to the combined power output.

2. The device of claim 1, wherein the first and second power converters are buck converters.

3. The device of claim 1, wherein the first and second power converters are low-dropout regulators (LDOs).

4. The device of claim 1, wherein the first and second power converters are of different types.

5. The device of claim 1, wherein the second power converter is configured to provide a first current at, the second power output being proportional to a second current provided by the first power converter at the first power output.

6. The device of claim 1, wherein the second power converter is configured to provide a current at the second power output without using a signal indicative of a voltage at the second power output.

7. The device of claim 1, wherein the power converter control circuit has a feedback voltage input coupled to the first power output, and the power converter control circuit configured to provide a control signal at the control output responsive to a first voltage at the first power output and a reference voltage at the reference voltage input.

8. The device of claim 7, wherein the first power converter is configured to provide the first voltage as proportional to the reference voltage responsive to the control signal.

9. The device of claim 1, wherein the power converter control circuit is a first power converter control circuit, the control output is a first control output, and the control input is a first control input;
wherein the device further comprises a second power converter control circuit having a reference current input and a second control output, the reference current input coupled to the first power output; and
wherein the second power converter has a second control input coupled to the second control output.

10. The device of claim 9, wherein the second power converter control circuit has a feedback current input coupled to the second power output, and the second power converter control circuit, is configured to provide a control signal at the second control output responsive to a first signal indicative of a first current at the first power output and a second signal indicative of a second current at the second power output.

11. The device of claim 10, further comprising a first current circuit and a second current circuit, the first current circuit coupled between the first power output and the reference current input and the second current circuit coupled between the second power output and the feedback current input.

12. The device of claim 10, wherein the reference current input is a first reference current input, the feedback current input is a first feedback current input, the control signal is a first control signal, and the device further comprises:
a third power converter having a third power input, a third control input, and a third power output, the third power output coupled to the combined power output; and
a third power converter control circuit having a second feedback current input, a second reference current input, and a third control output, the second feedback current input coupled to the third power output, the second reference current input coupled to the first power output, and the third power converter control circuit configured to provide a second control signal at the third control output responsive to the first signal and a third signal indicative of a third current at the third power output.

13. The device of claim 1, further comprising a power management integrated circuit (PMIC) having a PMIC input and a PMIC output, the PMIC input coupled to the combined power output.

14. The device of claim 13, wherein the PMIC is part of a solid state drive.

15. The device of claim 13, wherein the PMIC output is coupled to a solid state drive.

16. The device of claim 1, further comprising a power source having a first power source output and a second power source output, the first power source output coupled to the first power input, and the second power source output coupled to the second power input.

17. The device of claim 16, wherein the power source is configured to provide a first voltage at the first power source output and a second voltage at the second power output, and wherein a magnitude of the first voltage is greater than a magnitude of the second voltage.

18. The device of claim 1, wherein the first and second power converters are switching power converters.

* * * * *